United States Patent
Linares

(10) Patent No.: US 9,278,778 B2
(45) Date of Patent: Mar. 8, 2016

(54) MULTI-FUNCTIONAL PALLET WITH LOCATING SUPPORT STRUCTURE AND BUOYANCY CHARACTERISTICS AND INCLUDING RFID-GPS TRACKING AND LIGHT (SOUND) LOCATING FEATURES IN COMBINATION WITH MAGNETIC STACKABILITY DURING NON-USE

(71) Applicant: Oria Collapsibles, LLC, Auburn Hills, MI (US)

(72) Inventor: Miguel A. Linares, Bloomfield Hills, MI (US)

(73) Assignee: Oria Collapsibles, LLC, Auburn Hills, MI (US)

( * ) Notice: Subject to any disclaimer, the term of this patent is extended or adjusted under 35 U.S.C. 154(b) by 0 days.

(21) Appl. No.: 14/689,368

(22) Filed: Apr. 17, 2015

(65) Prior Publication Data
US 2015/0298854 A1    Oct. 22, 2015

Related U.S. Application Data

(60) Provisional application No. 61/982,007, filed on Apr. 21, 2014.

(51) Int. Cl.
| | |
|---|---|
| B63B 35/44 | (2006.01) |
| B65D 19/04 | (2006.01) |
| B65D 19/44 | (2006.01) |
| B65D 19/38 | (2006.01) |
| B63H 5/00 | (2006.01) |
| B63H 25/02 | (2006.01) |
| B63B 38/00 | (2006.01) |
| G06Q 10/08 | (2012.01) |

(Continued)

(52) U.S. Cl.
CPC ............... *B65D 19/04* (2013.01); *B63B 38/00* (2013.01); *B63H 5/00* (2013.01); *B63H 25/02* (2013.01); *B65D 19/385* (2013.01); *B65D 19/44* (2013.01); *G06K 19/0773* (2013.01); *G06Q 10/087* (2013.01); *G08B 5/36* (2013.01); *B65D 2519/0094* (2013.01); *B65D 2519/00348* (2013.01)

(58) Field of Classification Search
USPC ............................................... 114/263; 441/7
IPC ............... B65D 19/04; B63B 38/00; B63H 5/00
See application file for complete search history.

(56) References Cited

U.S. PATENT DOCUMENTS

| | | | |
|---|---|---|---|
| 3,696,761 A | 10/1972 | Brown | |
| 4,361,822 A | 11/1982 | Adler | |
| 7,232,354 B2 * | 6/2007 | Olson | B63B 22/12 441/7 |

(Continued)

*Primary Examiner* — Stephen Avila
(74) *Attorney, Agent, or Firm* — Dinsmore & Shohl LLP; Douglas J. McEvoy

(57) ABSTRACT

A structurally supporting pallet article including a rectangular shaped body having a specified thickness and a plurality of downwardly extending support locations. A processor controlled receiver is incorporated into the body for providing at least one of tracking and identification of cargo supported upon said body. Visual identification of a selected pallet article is facilitated by the inclusion of illuminating elements. A second embodiment discloses a pallet having a three dimensional shaped body. A sensor is integrated into the body for determining when the body is immersed in a body of water. A plurality of bladders are supported within the body in first retracted positions and which, upon being triggered by the sensor, are deployed in outwardly expanded fashion through openings along the body. A propulsion and steerage mechanism is integrated into an underside of the body.

18 Claims, 6 Drawing Sheets

(51) Int. Cl.
  *G06K 19/077* (2006.01)
  *G08B 5/36* (2006.01)

(56) References Cited

U.S. PATENT DOCUMENTS 7,825,771 B2  11/2010  Bhogal et al.
8,356,562 B2  1/2013  Palmer
8,418,631 B2  4/2013  Linares
8,418,632 B2  4/2013  Linares
2002/0047071 A1*  4/2002  Illingworth ........... B64C 11/001
                                                     244/199.1
2008/0122610 A1*  5/2008  Muirhead .......... B65D 19/0016
                                                     340/505
2011/0061572 A1  3/2011  Liu et al.

\* cited by examiner

MULTI-FUNCTIONAL PALLET WITH LOCATING SUPPORT STRUCTURE AND BUOYANCY CHARACTERISTICS AND INCLUDING RFID-GPS TRACKING AND LIGHT (SOUND) LOCATING FEATURES IN COMBINATION WITH MAGNETIC STACKABILITY DURING NON-USE

CROSS-REFERENCE TO RELATED APPLICATIONS

This application claims the benefit of U.S. Provisional Application 61/982,007 filed on Apr. 21, 2014, the contents of which are incorporated herein in its entirety.

FIELD OF THE INVENTION

The present invention is directed to a composite stackable pallet constructions with both locating support structure and buoyancy features for providing both of heavy duty support and multiple stack-ability. More particularly, the present invention discloses a multi-functional pallet assembly which includes enhanced tracking and identification features in use both on land (including during transit or when maintained within a storage facility) as well as when deployed in a seaborne application.

BACKGROUND OF THE INVENTION

The prior art is documented with examples of pallet support assemblies and structures. A first example of this is depicted in U.S. Pat. No. 8,418,631, issued to Linares, which teaches a body having a buoyant inducing element for supporting upon a body of water. The buoyant inducing element includes a plurality of bladders deployable into an end-to-end perimeter extending arrangement relative to the body. In a further design, a pressurized tank is contained within the body and holds a volume of a compressed gas and in communication with the deployable bladders. The body may also include upper and lower vertically displaceable halves, with the elevation of the upper half causing one way air inlet valves disposed within a bottom surface of the lower halve to fill an expanded interior defined between the halves, via vacuum inlet pressure acting upon the one way valves.

U.S. Pat. No. 8,418,632, also to Linares, teaches a structurally reinforcing pallet having an insert exhibiting a three dimensional shape with a top, sides and bottom. A plasticized material is applied over the insert according to a selected thickness and in order to encapsulate the insert. A first plurality of upper edge projecting and positional locating rim portions are exhibited about a periphery of an insert incorporated into a first pallet and, in combination with a second mating plurality of recessed underside edge extending locations exhibited about a periphery of a further insert incorporated into a second pallet, enable multiple stacking of pallets in laterally stabilized fashion.

The prior art also documents various examples of pallet constructions, such as which are capable of being stacked in multiple fashion when not in use. A first example of this is depicted by the pallet construction of Palmer, U.S. Pat. No. 8,356,562, and having a first portion and a second portion that may be arranged in a use or nesting positions to help facilitate more efficient storage of the portions. The portions may also include one or more magnets that may be used to help secure the portions in the use position and/or the nested positions. The portions may include one or more interlocking and/or engaging features that may be used to help secure the portions in the use position and/or the nested positions. If desired, the first and second portions may be sized and configured to be independently used as pallets.

A further example of a magnetic pallet is depicted in U.S. Pat. No. 4,361,822, to Adler, which teaches a plurality of individual, flexible polymer magnetic strips in a double layer thickness between metallic front and back enclosure plates to provide a substantially continuous magnetic field across both of front and back planar surfaces. Other examples drawn from the prior art include the all in one multifunction pallet of Liu et al, US 2011/0061572, which teaches a main part of the pallet, collapsible supporting legs, belts, joint shafts coupled by nuts, and RFID tags.

SUMMARY OF THE INVENTION

The present invention according to a first embodiment discloses a structurally supporting pallet article including a rectangular shaped body having a specified thickness and a plurality of downwardly extending support locations. A processor controlled receiver is incorporated into the body for providing at least one of tracking and identification of cargo supported upon said body. Visual identification of a selected pallet article is facilitated by the inclusion of illuminating elements (such as strategically placed side and edge LED lighting elements).

The cargo includes a plurality of part supporting template portions seating upon mating recessed and locating channels configured into an upper surface of said insert, the channels each being arranged in a closed perimeter to establish a recessed interior for fixing in position a selected template portion. Concave vacuum portions are incorporated into the recess located and perimeter extending channels, a perimeter extending rubber gasket surrounding each channel and template portion underside, a vacuum generating structure incorporated into the body and communicating with each of the concave vacuum portion.

Also disclosed are a plurality of surface located manual engaging/release valves incorporated into passageways leading to fluid communicating inside or underside locations associated with each of the vacuum generating portions. The valves are manipulated in a first direction to create a vacuum holding seal for retaining the template portions and their hollow sealed interiors, the valves further being manipulated in a second direction for de-pressurizing the vacuum force associated with a given surface located item or template and in order to permit removal thereof from the body.

Additional features associated with the pallet article include a plurality of edge or corner defined mating locations established between upper and lower surfaces, such that a second identically configured pallet is capable of being seated in supporting fashion upon a first pallet. The body may further include at least one of a galvanized steel, corrugated paperboard, honeycomb paperboard or like rigid and structurally supporting material.

The pallet body may be coated by a plasticized material which may further include an aggregate material entrained therein. Other features include an antenna extending from the receiver and communicating with a remote transmitter.

The article in a second embodiment discloses a pallet having a three dimensional shaped body. A sensor is integrated into the body for determining when the body is immersed in a body of water. A plurality of bladders are supported within the body in first retracted positions and which, upon being triggered by the sensor, are deployed in outwardly expanded fashion through openings extending along perimeter extending edges of the body such that the expanded bladders define an end-to-end perimeter contacting and extending arrangement in order to support the body upon the body of water in a buoyant fashion. Also disclosed is a propulsion and steerage mechanism integrated into an underside of the body and which is actuated from a retracted position to a deployed position for navigating the body upon the body of water.

Either of the above embodiments may include the provision of magnets disposed in upper and lower surface proximate locations of the first and second stacked bodies for facilitating inter-attraction between the bodies in a non-use position. The magnets further include upper surface located and spring loaded magnets in combination with bottom surface recessed magnets of opposite polarity which, upon stacking atop an identically configured pallet, draws the upper spring supported magnet of a lower pallet representing the first stacked body into seating contact with an opposing and underside situated magnet associated with an upper pallet representing the second stacked body.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
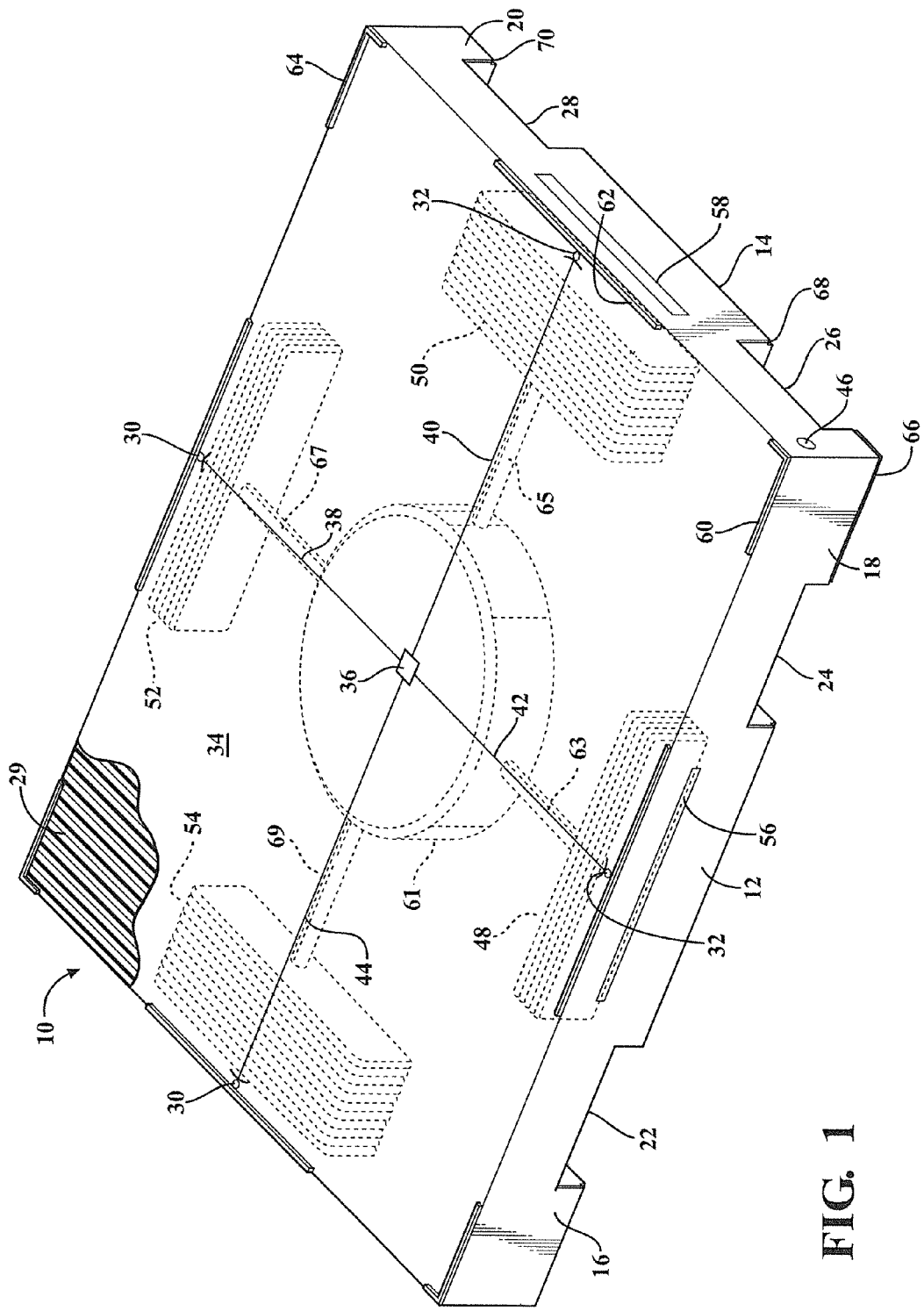
FIG. 1 is a perspective illustration of a pallet article according to one non-limiting variant and which includes a combination of edge-locating and lateral restraining features, GPS/RFID receiver technology as well as audio/visual identification output.

As previously described, the present invention discloses a multi-functional pallet assembly which incorporates non-obvious modifications and improvements from the designs set forth in each of U.S. Pat. Nos. 8,418,631 and 8,418,632, both issued Apr. 16, 2013. As also previously described, the stackable pallet construction is designed so as to provide heavy duty support of items located thereupon and exhibits, according to the selected variant, a structural spine or insert (such as a heavy duty paperboard, honeycomb construction, other corrugated material or galvanized insert) which operates to greatly enhance the strength of the pallet assembly in supporting heavier loads set thereupon.

As will also be further described in detail, the manner of constructing the structural pallet article can vary greatly and can, in a most simplified construction, incorporate a sprayable or otherwise coat-able plasticized or polymer material, such including any known or proprietary blend and which can also include any specific additive (such as an aggregate or particulate) which enhances certain operational characteristics best suited for given environmental applications. In other non-limiting applications, the underlying blank or insert can be produced such as by placing within a mold cavity, or other manufacturing medium associated with the creation of the pallet article, and about which is injection molded or otherwise formed a fire/heat proof composite thermoset or composite thermoplastic material.

As will be further described, the completed pallet article can be solid, however can also encompass interiorly extending open aperture locations, recesses or other configurations, these further reducing the overall weight of the pallet without compromising its strength. The underside of each pallet can further exhibit linear width and/or length extending recesses, and which are designed to seat inserting forks associated with a conventional forklift machine.

Without limitation, the pallet assembly can include an insert or structural supporting blank which is sprayed or otherwise coated with a plastic or other polymer based recipe (including such as a proprietary formula and which may also include any particulate or aggregate additive for enhancing desired operational characteristics for varying environmental applications). Without limitation, the proprietary or other plasticized coating can also incorporate, without limitation, a fire/heat proof composite thermoset or composite thermoplastic material.

In a most simplified construction, a spray-able or otherwise coat-able plasticized or polymer material is provided for coating the pallet body, such including any known or proprietary blend and which can also include any specific additive (such as an aggregate or particulate) which enhances certain operational characteristics best suited for given environmental applications. For purposes of the present description, the composition and techniques surrounding the application of a plastic spray material contemplate such as any type of polystyrene, polyurethane or other material which can be spray applied or flowed over the exposed surfaces of the substratum material in such a way as to maintain it structural integrity while also delivering long term environmental protection.

Without limitation, the term plasticized coating can apply to any type of water-based polymer providing barrier and functional coatings, such as may further incorporate water-based surface modifiers, additives and polymers for numerous industries including wood care, industrial coatings, inks, fibers, composites, and construction products. In other non-limiting applications, the underlying blank or insert can be produced such as by placing within a mold cavity, or other manufacturing medium associated with the creation of the pallet article, and about which is injection molded or otherwise formed a fire/heat proof composite thermoset or composite thermoplastic material.

As will be further described, the pallet provides a number of useful features, including the incorporation of a GPS/RFID receiver for assisting in tracking of assets or cargo supported upon the pallet. Other features include any type of audio or visual feature, such as blinking lights which are activated by an integrated receiver/transmitter, this activating such as in response to a transmitter used by location tracking/inventorying personnel, or alternatively marine search and rescue personnel, in each case in order to assist in locating a desired pallet.

Yet additional features include edge or corner located magnets, typically spring loaded, which are positioned at both upper and lower facing surfaces of the pallet and which generate inter-attracting forces with successively stacked pallets, such as in a non-use storage configuration. Other features include downwardly projecting feet which configure pallet fork receiving locations for each pallet and which further mate with pallet upper surface seating recesses to further facilitate ease of stack-ability.

Other features include deployable bladders in combination with an underside deployable and manual or remote controlled propeller. An upper surface of the pallet can further exhibit recessed seating profiles for receiving a perimeter of particularly configured item, this in combination with vacuum generating structure built into the pallet article and include a plurality of surface located manual release valves for de-pressurizing a reverse vacuum force associated with a given surface located item to permit removal thereof from the pallet.

The above stated, and referring to FIG. 1, a perspective view is shown of a pallet, generally at 10. The pallets each incorporate an insert, blank or other article exhibiting any of a related variety of shapes and profiles, each of which exhibits a generally three dimensional rectangular shaped body, from an underside of which projects along each interconnected side a plurality of intermediate side (e.g. at 12 and 14) and corner (e.g. at 16, 18 and 20 as shown in FIG. 1) located and downwardly extending support locations or feet. Additional intermediate/middle support feet and alternating corner feet are also provided but are hidden from view in FIG. 1. As previously described, the construction of the pallet and support feet is such that intermediate apertures or recesses (see surfaces 22/24 and 26/28 in selected visible sides in FIG. 1) are defined as shown for facilitating insertion of lift forks for transporting the pallet(s).

A plasticized coating representative of that previously described is partially depicted at 29 upon an upper corner portion of pallet 10, it again being understood that substantially the entire pallet is sprayed or otherwise coated with the plastic polymer, such encapsulating all of the pallet components with the exception of the LED (light emitting diode) or other visual identifying features associate with the pallet, such as depicted by pairs 30 and 32 in FIG. 1, located upon upper edge locations of a top surface 34 of the pallet. As will be further described, the placement of the emitting lights on the top surface of the pallet is depicted in FIG. 1 is understood to be useful in instances of a seaborne floating pallet in which overhead identification is desired.

The above said, additional lights (LED or other illuminating elements) can be located (or repositioned) to the outer side edges of the pallet, such also being configured for use with a land supported variant of the pallet. The wireless receiver element (such as shown at 36 and which is built into the construction of the pallet body) can, upon receipt of a transmitted locating signal, illuminate the lighting elements in order to facilitate visual location of the pallet article. This can additionally include identification of a pallet article held within a storage facility, such as along with numerous other and similarly constructed pallets in which identification might otherwise be more difficult.

The built-in receiver/transmitter, again at 36 may include a built-in or remote accessed power supply and is communicated, via one or more extending antennas 38, 40, 42 and 44, by a remote (typically location proximate) transmitter, such in one non-limiting variant being a hand-held device employed by warehouse personnel for locating a specific pallet. In another application, search and rescue personnel located on a ship or in an aircraft in a seaborne environment can utilize a version of the remote transmitter for activating a selected pallet LED pattern to assist in location.

Although not shown, it is further envisioned and understood that any suitable audio visual structure can be incorporated into the pallet architecture in order to enhance its article tracking/identification protocols. Such can include providing the LED or other illuminating components with different color or flashing patterns for identifying certain types of cargo, as well as potentially combining a piezo style emitter for providing an audial output or chirp along with the visual output, one advantage of which being the ability to identify such as an interiorly stacked or like positioned pallet in which the LED or other visual output locations may be partially or entirely obscured.

An associated global positioning (GPS) or radio frequency identification (RFID) receiver technology can be utilized with the functionality built into the pallet for assisting in tracking and cataloging the cargo identified with the selected pallet(s). Without limitation, such external functionality can incorporate suitable processor and memory features for tracking in real time the location and disposition of various cargo or inventory items associated with a given pallet, such further being associated with JIT (just in time) inventory applications in which a premium is placed on the ability to track and inventory multiple cargo/pallets in remote electronic and real time fashion. Consistent with the alternate variant for tracking a pallet in a seaborne environment (e.g. floating upon the water such as is depicted by the bladder actuated variant of FIG. 2) the associated receiver and processor technology tied to the GPS/RFID functionality can further include identifying and cross referencing a given pallet with the transmitter activating protocol for illuminating such as the LED's and to assist in seaborne location and/or recovery.

Figure 2:
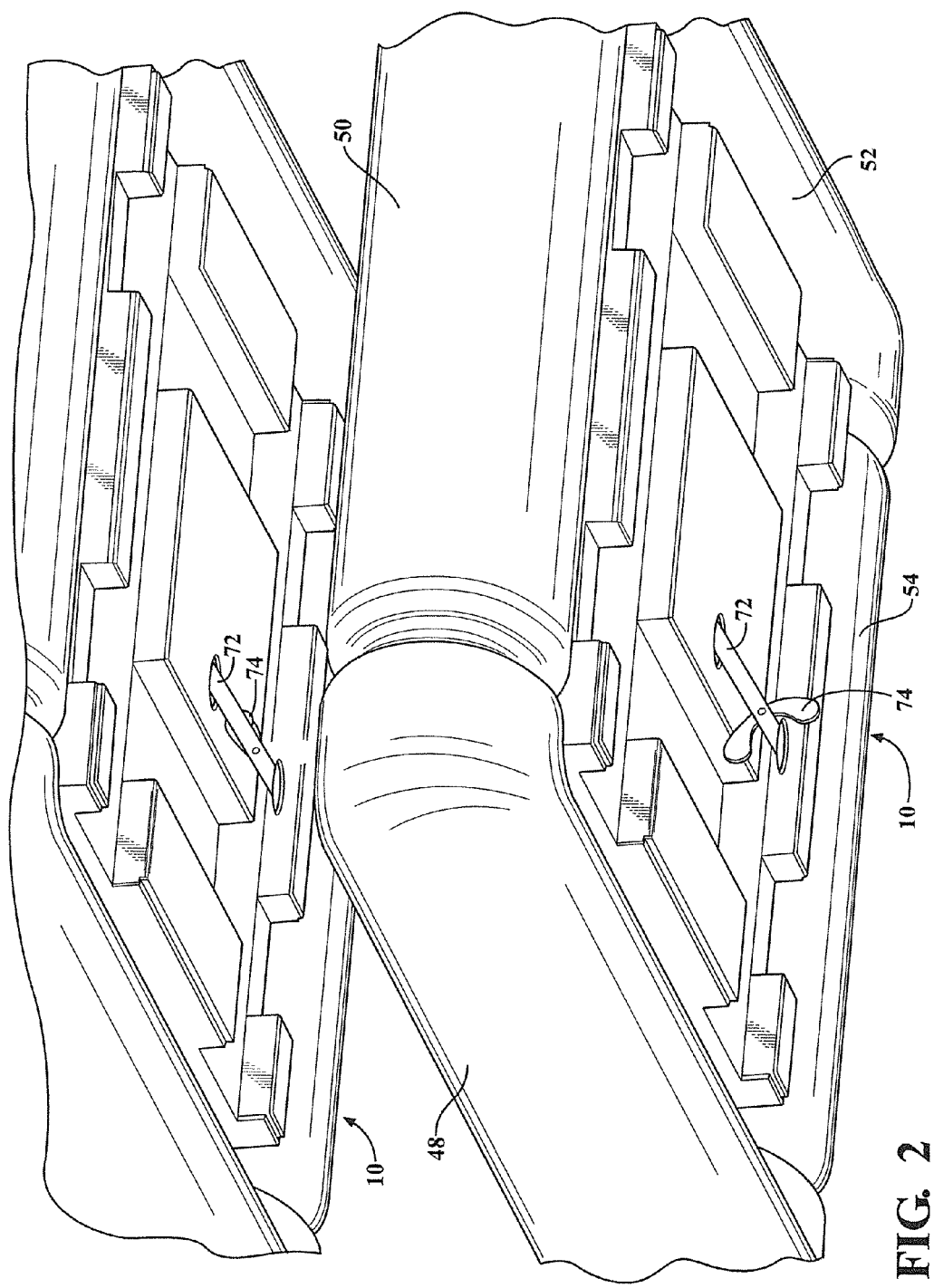
FIG. 2 is an underside looking perspective of a pair of pallet assemblies exhibiting perimeter encircling and deployable bladders in combination with a underside deployable or retractable propeller for providing any of remote, radio controlled or manual controlled steerage of the seaborne pallet.

Other features noted in FIG. 1 also include the provision of a side located water sensor 46 which, upon detecting the pallet being deployed in a water environment (e.g. being launched or dropped from a ship or plane), communicates with a suitable CO2 or other pressurized canister (see in phantom at 61 in FIG. 1) in order to activate and deploy the perimeter defining bladders (see further at 48, 50, 52 and 54 again in phantom in FIG. 1 as well as deployed in FIG. 2 and which are communicated to the pressurized canister 61 via lines 63, 65, 67 and 69. Side disposed slots, see at 56 and 58, are provided along each side of the pallet and, upon bring triggered by the sensor 46, operate to permit outward displacing deployment of the bladders 48-54.

Figure 3:
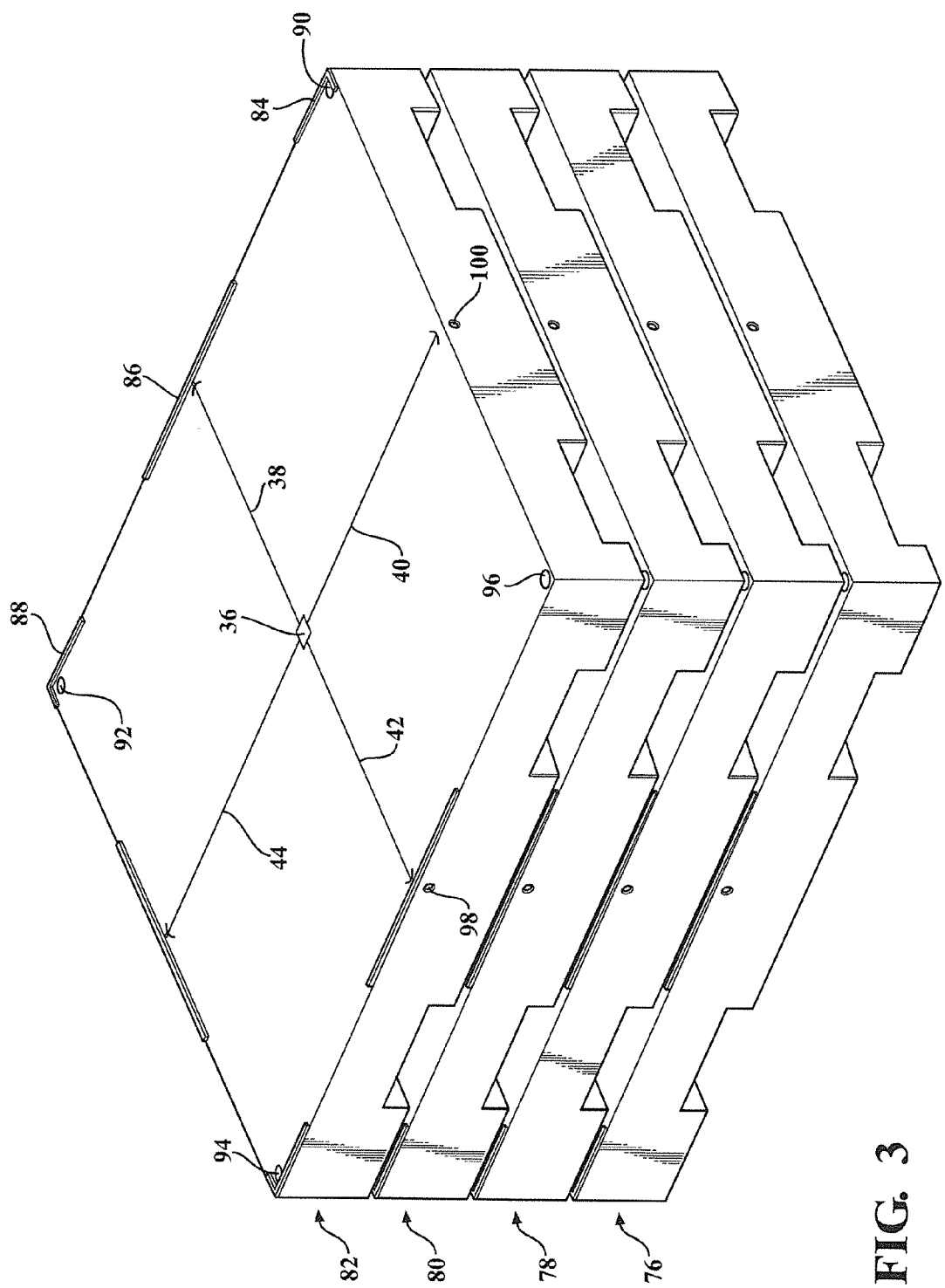
FIG. 3 is an illustration of a plurality of stacked pallets according to one non-limiting variant and exhibiting inter-pallet mating locating and centering features in combination with magnetic inter stack-ability and side edge located visual detection lights.

Also located about the outer and upper perimeter of the pallet top surface are a plurality of upper perimeter edge spaced apart and central and corner ridge sections (see at 60, 62, 64, et. seq) these seating with corresponding bottom recessed edge notches (at 66, 68, 70, et. seq) defined in the pallet undersides outer edge, this in order to securely interseat and maintain a plurality of vertically stacked patents (see again as shown in FIG. 3) in a manner such that the projecting upper and outer perimeter defining ridge sections respectively seat within the underside recessed edge notches and to prevent the stacked pallets from shifting or otherwise easily becoming separated from each other.

Referring again to FIG. 2, an underside looking perspective of a pair of pallet assemblies 10 again exhibits the perimeter encircling and deployable bladders 48, 50, 52 and 54. In combination, an underside deployable steerage and propulsion mechanism is provided and such as which can be integrated into the sensor mechanism along with the deployment of the buoyancy supporting bladders.

The steerage/propulsion mechanism represents an additional feature for providing transit of the pallet body (either in a cargo supported or other life emergency supporting event) upon a body of water. In one non limiting application, a retractable propeller, see extending shaft 72 and end supported and inter-rotating propeller 74, is initially maintained in a retracted underside position (see upper pallet underside in FIG. 2). As previously indicated, and upon the body coming into immersed contact with the body of water (not shown) the propeller 74 and shaft 72 are rotated to a downwardly deployed position (see lower pallet underside in FIG. 2), this occurring either automatically such as in response to triggering of the sensor or manually by an operator.

The present invention contemplates any of remote, radio controlled or manual controlled steerage of the seaborne pallet. Although not shown, it is understood that any suitable portable structure can be provided for enabling at least short term propulsion of the pallet and which can envision a battery and electric motor incorporated into the pallet body and for providing for powered rotation of the propeller 74. Alternatively, a separate rudder (not shown) can be provided for providing steering of the pallet, it being also understood that the angle or orientation of the propeller shaft 72 can be likewise be made to be movable (dynamic), such as by additional servo drive technology built into the pallet architecture, in order to provide a necessary steerage of the pallet when traversing atop a body of water.

FIG. 3 is again an illustration of a plurality of stacked pallets, see generally at 76, 78, 80 and 82, according to a further one non-limiting variant and exhibiting inter-pallet mating locating and centering features in combination with magnetic inter stack-ability and side edge located visual detection lights. Repeated from the variant of FIG. 1 is the provision of side and edge seating ridge sections, see also at 84, 86, 88, et. seq. (these seating the underside edge notches previously identified at 66, 68 and 70 in FIG. 1), as well as showing the GPS transmitter/receiver 36 (such as for global and local tracking) and antenna structure 38-44 as previously depicted.

Also shown for uppermost pallet 82 are a first plurality of upper corner edge located magnets 90, 92, 94 and 96 as well as side located LED's or other illuminating elements, selected one's being shown at 98 and 100 and which communicated with the powered transmitter/receiver 36, for providing visual detection.

Figure 4:
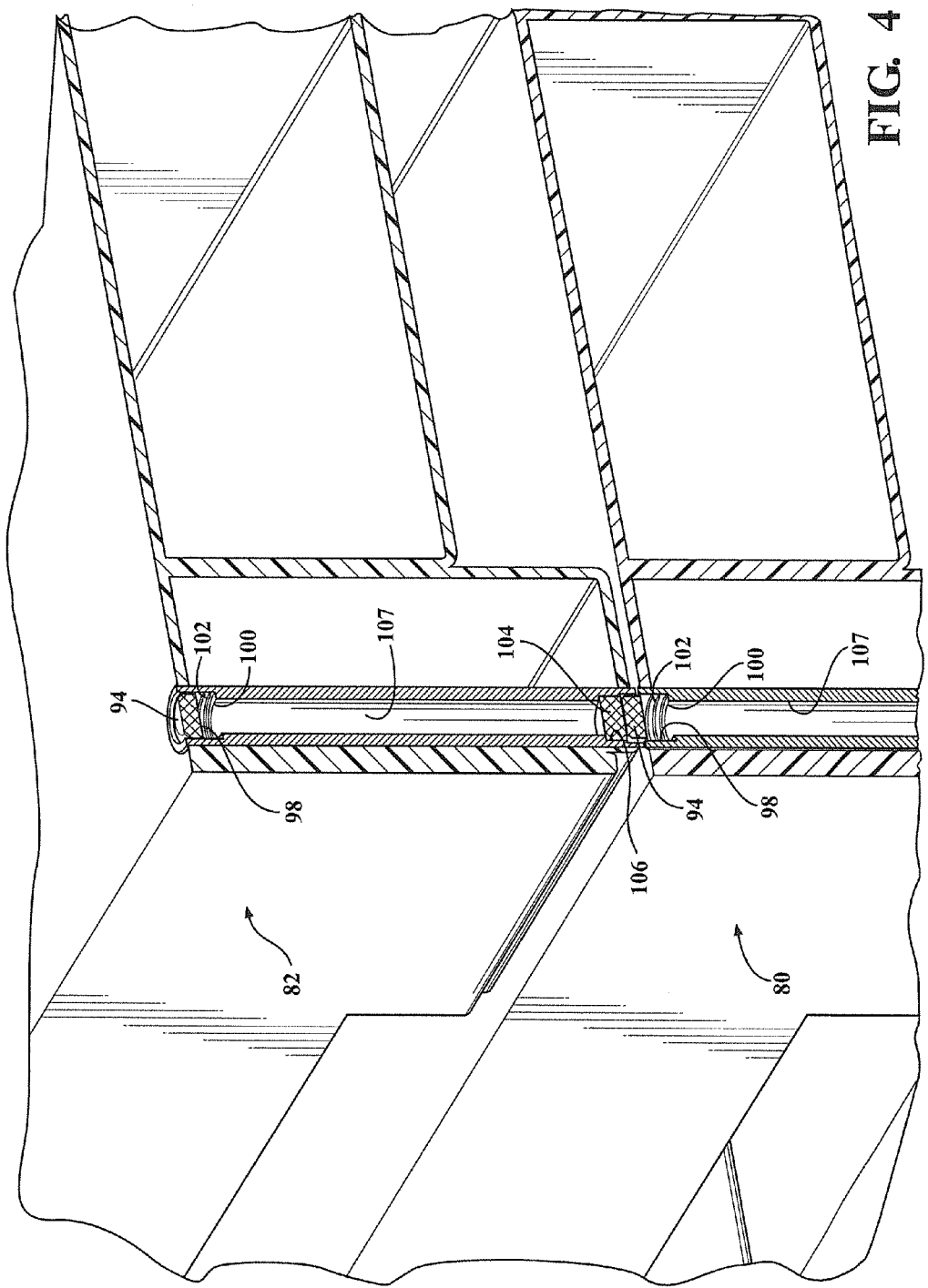
FIG. 4 is an enlarged and partially cutaway corner location of a pair of stacked pallets such as shown in FIG. 3 and further showing the configuration of the inter-attracting magnets including an upper surface located and spring loaded magnet, in combination with a bottom surface fixed/recessed magnet of opposite polarity which, upon stacking atop an identically configured pallet, draws the upper spring supported magnet of the lower pallet into a recessed seating location in communication with the underside of the upper pallet.

FIG. 4 is an enlarged and partially cutaway corner location of a pair of stacked pallets such as shown at 80 and 82 in FIG. 3 and further showing one non-limiting configuration of inter-attracting magnets for providing enhanced stack-ability of multiple pallets, such as during non-use applications not limited to storage or transport. In the example illustration, the selected corner location of the upper pallet 80 includes an upper corner surface located and spring loaded magnet 94 (see as previously depicted in FIG. 3), this supported within a pocket or recess 98 defined in the upper corner with a bottom 100, upon which a coil spring 102 secures the magnet 94.

In combination, each inter-stacked pallet also includes a bottom surface fixed/recessed magnet 104 of opposite polarity with respect to the upper located magnets 90-96. As further shown, the magnet 104 is seated within an underside seating pocket 106 and which, upon stacking atop an identically configured pallet, draws the upper spring supported and opposite polarity magnet 94 of the lower pallet 80 from a nominally flush position into an upper displacing and recessed seating location in communication with the underside of the upper pallet 82. The magnets can be incorporated into vertically arranged tubes 107 arranged the general height of the pallet body and which facilitate correct alignment and inter-attraction in use.

In this fashion, the pallets are inter-attracted in a fashion which further facilitates and maintains their multiple stack-ability as well as which limits the instances of unexpected lateral or shearing disengagement of the pallets. It is also noted that the pallets shown in FIG. 4 do not require edge locating structure such as depicted in FIGS. 1-3 however such can be added within the scope of the invention.

Figure 5:
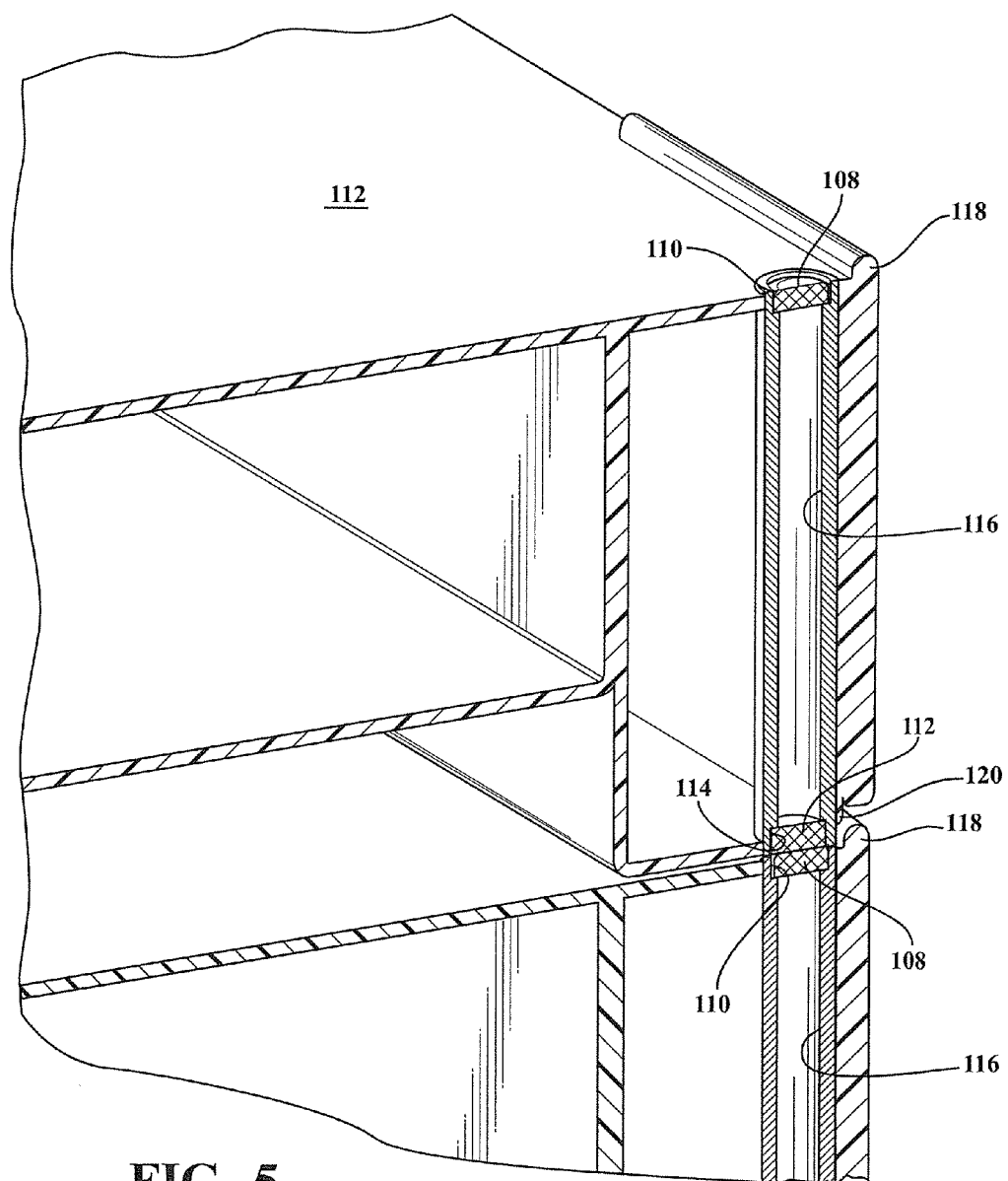
FIG. 5 is an illustration similar to that previously presented in FIG. 4 of an enlarged and partially cutaway corner location of a further variant of stacked pallets and further showing a further configuration of inter-attracting magnets including an upper surface aligned magnet in combination with a bottom surface aligned magnet of opposite polarity which, upon stacking atop an identically configured pallet, creates an inter-attracting magnetic bond.

Proceeding to FIG. 5, a further configuration of inter-attracting magnets is depicted for assisting in maintaining the pallets in inter-attracting and stacked fashion. In the illustration provided, this variant of the magnets includes an upper surface aligned and corner positioned magnet 108 seated within a corner pocket 110 defined in the selected pallet 68. In combination, a bottom surface aligned magnet 112 of opposite polarity is embedded within an underside aligning pocket 114 and which, upon stacking atop an identically configured pallet, creates an inter-attracting magnetic bond in the manner previously described.

As described in the embodiment of FIG. 4, the upper and lower magnets can be seated in individually vertically extending tubes 116 which are configured into the architecture of the pallet construction 112 and which facilitate aligning location of the pallets when stacked one atop the other. Also shown in FIG. 5 is the provision of reconfigured upper 118 and lower 120 elongated and mating projections associated with extending side and corner edge surfaces of the mating pallets and which exhibit overlapping and arcuate cross sectional profiles to facilitate seating of the pallets in the manner depicted and which can operate in combination with the magnets to ensure correct alignment and stack-ability.

Also envisioned is the possibility of reconfiguring the pallets in order to provide any desired mating and alternating surface configurations for effectively stacking the pallets in multiple fashion. Although not shown, additional interior or side edge extending pairs of magnets can be provided in order to modify the attraction forces between the pallets in the stacked configuration. Also, and although not shown, it is also understood that hold down straps and associated strap engagement locations can be integrated into any suitably configured pallet body, these being provided alternate or in combination with the features described herein and in order to better secure items supported thereupon.

Figure 6:
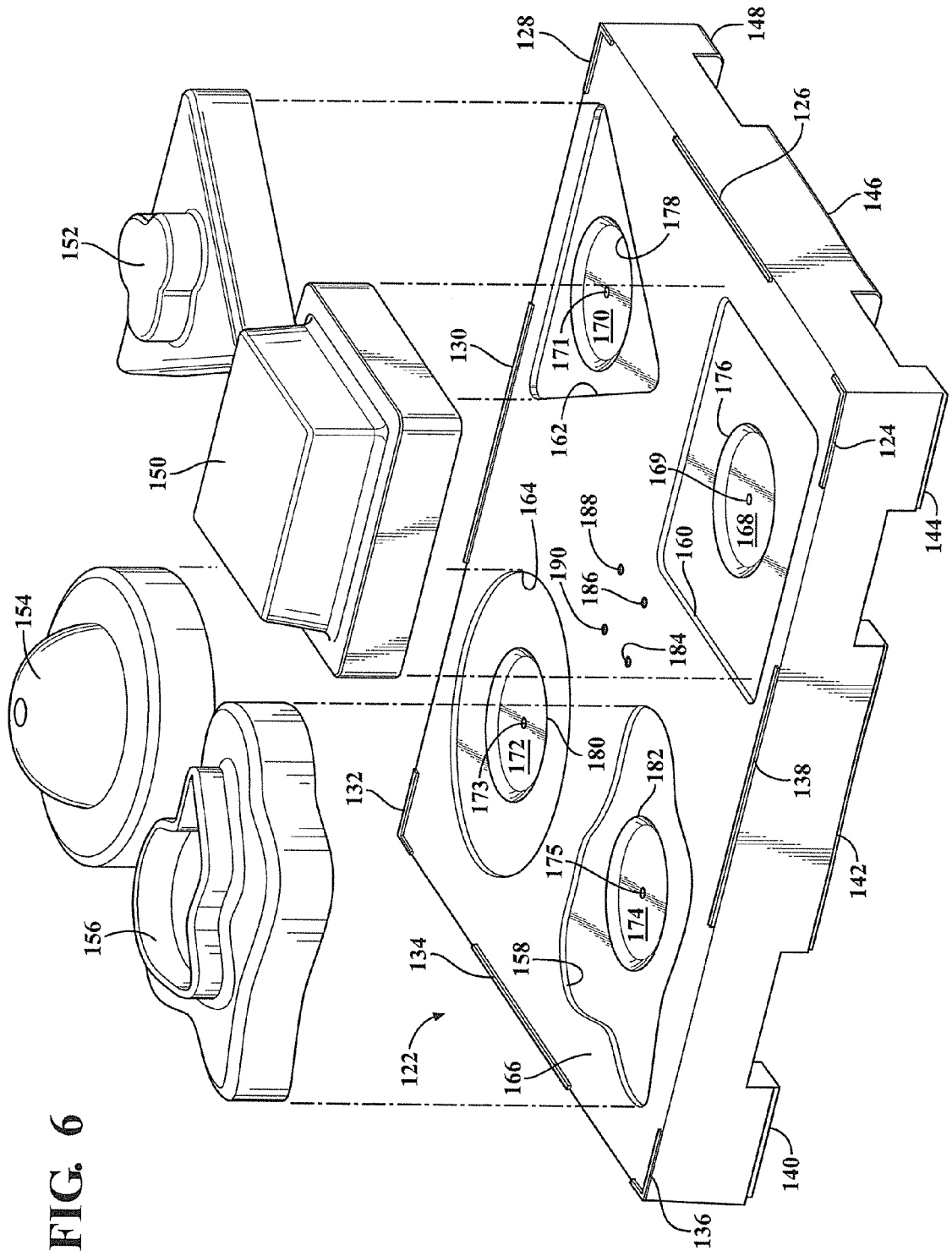
FIG. 6 is an illustration of upper surface of a pallet which exhibits upper surface recessed seating profiles for receiving corresponding shaped perimeters of particularly configured items, these in combination with vacuum generating structure built into the pallet article and include a plurality of surface located manual release valves for de-pressurizing a reverse vacuum force associated with a given surface located item to permit removal thereof from the pallet.

Finally, FIG. 6 is an illustration of a further variant of a pallet, generally at 122, of a modified and structurally supporting pallet which is similar in overall configuration and construction to that previously illustrated and described at 10 according to a further embodiment. As in FIG. 1, pluralities of upper rim edges 124, 126, 128, 130, 132, 134, 136 and 138 and lower recessed edges (again selectively shown at 140-148) are again shown and establish multiple stacking of the pallets in the manner depicted in FIG. 3.

Also illustrated are a plurality of part supporting template portions, see at 150, 152, 154 and 156, which are arrayed in partially exploded fashion above mating recessed and locating channels, see as further respectively depicted by outlines 158, 160, 162 and 164 and which are arranged in closed perimeter extending fashion, configured into upper surface 166 of the pallet 122 to each establish a recessed interior for fixing in position a selected template portion.

Upon the template portions 150-156 being seated within their associated channel outlines, additional pluralities of individual parts (not shown) are provided and are capable of being stacked in plural supported fashion upon each template portion which in effect defines a mini platen like support for a given stack of parts. In this fashion, such parts can include recessed undersides for establishing multiple stack-ability, and further such that each part exhibits a recess interior profile matching each of those associated with the upper surfaces of each template portion.

Also depicted in FIG. 6 are concave or other shaped and vacuum generating/retaining portions, see at 168, 170, 172 and 174 associated with each of the template portions, the concave vacuum portions being circular as shown and each further including an outer perimeter extending rubber gasket or seal, further at 176, 178, 180 and 182. A vacuum generating structure is built into the pallet article 122 (such as which can include a modification of the tank represented in FIG. 1 at 61) and which includes conduit sections communicable to each of a plurality of surface located manual engaging/release valves, see at 184, 186, 188 and 190, these in turn being incorporated into reconfigured passageways leading to fluid communicating inside or underside locations associated with each of the vacuum generating portion, such represented by apertures 169, 171, 173 and 175 located inside of the concave locations 168, 170, 172 and 174.

Upon stacking the template portions 150-156 within the mating channels and in communication with the vacuum generating portions, a suitable controller is provided for manipulating the valves 184-190 in a first direction to create a vacuum holding seal for retaining the template portions and their hollow sealed interiors (via the gaskets 176-182 exerting a suction force against the underside perimeter edges of the template portions 150, 152, 154 and 156 upon a vacuum being generated through interconnected apertures 169, 171, 173 and 175). The valves 184-190 can also be manipulated in a second direction for de-pressurizing the vacuum force associated with a given surface located item or template and in order to permit removal thereof from the pallet.

Having described my invention, other and additional preferred embodiments will become apparent to those skilled in the art to which it pertains, and without deviating from the scope of the appended claims.

I claim:

1. A structurally supporting pallet shaped article, comprising:
    a rectangular shaped body having a specified thickness and including a plurality of downwardly extending support locations;
    a receiver incorporated into said body for providing at least one of tracking and identification of cargo supported upon said body;
    said cargo including a plurality of part supporting template portions seating upon mating recessed and locating channels configured into an upper surface of said insert, said channels each being arranged in a closed perimeter to establish a recessed interior for fixing in position a selected template portion;
    concave vacuum portions incorporated into said recess located and perimeter extending channels, a perimeter extending rubber gasket surrounding said channel and said template portion underside, a vacuum generating structure incorporated into said body and communicating with each of said concave vacuum portions; and
    a plurality of surface located manual engaging/release valves incorporated into passageways leading to fluid communicating inside or underside locations associated with each of said vacuum generating portions, said valves being manipulated in a first direction to create a vacuum holding seal for retaining the template portions and their hollow sealed interiors, said valves further being manipulated in a second direction for de-pressurizing the vacuum force associated with a given surface located item or template and in order to permit removal thereof from said body.

2. The article as described in claim 1, said article operating as a reinforced pallet and further comprising a plurality of edge or corner defined mating locations established between upper and lower surfaces, such that a second identically configured pallet is capable of being seated in supporting fashion upon a first pallet.

3. The pallet as described in claim 1, said insert exhibiting a specified shape and size and further comprising at least one of a galvanized steel, corrugated paperboard, honeycomb paperboard or like rigid and structurally supporting material.

4. The article as described in claim 1, further comprising a plasticized material encapsulating said body.

5. The article as described in claim 4, further comprising an aggregate material entrained within said plasticized material.

6. The article as described in claim 1, further comprising at least one antenna extending from said receiver and communicating with a remote transmitter.

7. The article as described in claim 1, further comprising a plurality of bladders expanding from a stored position within said insert to an expanded and deployed position outside of said insert in order to establish buoyancy upon a body of water.

8. The article as described in claim 7, further comprising a sensor in said insert for determining the existing of the body of water and for deploying actuation of said bladders.

9. The article as described in claim 7, further comprising a propulsion and steerage mechanism incorporated into said insert and projecting from an underside location.

10. The article as described in claim 1, further comprising inter-attracting magnets disposed in upper and lower surface proximate locations of said pallets for facilitating adhered stack ability.

11. The article as described in claim 9, said magnets further comprising upper surface located and spring loaded magnets in combination with bottom surface recessed magnets of opposite polarity which, upon stacking atop an identically configured pallet, draws said upper spring supported magnet of a lower pallet into seating contact with an opposing and underside situated magnet associated with a upper pallet.

12. The article as described in claim 1, further comprising at least one audio-visual output incorporated into said insert for identifying the location of said pallet upon receipt by said receiver of a location querying signal from said transmitter.

13. The article as described in claim 12, said output further comprising a plurality of edge located LED illuminating elements.

14. The article as described in claim 2, said mating locations further comprising pluralities of upper rim edges and lower recessed edges for establishing multiple stacking of a plurality of pallets.

15. A pallet, comprising:
a three dimensional shaped body;
a sensor integrated into said body for determining when said body is immersed in a body of water;
a plurality of bladders supported within said body in first retracted positions and which, upon being triggered by said sensor, are deployed in outwardly expanded fashion through openings extending along perimeter extending edges of said body such that said expanded bladders define an end-to-end perimeter contacting and extending arrangement in order to support said body upon the body of water in a buoyant fashion;
a propulsion and steerage mechanism integrated into an underside of said body and which is actuated from a retracted position to a deployed position for navigating said body upon the body of water;
said three dimensional shaped body further including upper and lower identically constructed and stacked bodies, magnets being disposed in upper and lower surface proximate locations of each of said stacked bodies and facilitating inter-attraction between said bodies in a non-use condition; and
said upper surface located magnets each further including an underside positioned biasing spring which, said lower surface located magnets further including recessed magnets of opposite polarity so that, upon stacking the upper body atop the lower body, said upper surface located and spring supported magnets of said lower body are drawn into seating contact with said opposing and lower surface located magnets of said upper body.

16. The pallet as described in claim 15, further comprising a receiver incorporated into said insert for providing at least one of tracking and identification of cargo supported upon said pallet.

17. The pallet as described in claim 15, further comprising at least one antenna extending from said receiver and communicating with a remote transmitter.

18. A pallet, comprising:
a three dimensional shaped body;
a sensor integrated into said body for determining when said body is immersed in a body of water;
a plurality of bladders supported within said body in first retracted positions and which, upon being triggered by said sensor, are deployed in outwardly expanded fashion through openings extending along perimeter extending edges of said body such that said expanded bladders define an end-to-end perimeter contacting and extending arrangement in order to support said body upon the body of water in a buoyant fashion;
a propulsion and steerage mechanism integrated into an underside of said body and which is actuated from a retracted position to a deployed position for navigating said body upon the body of water; and
said three dimensional shaped body further including upper and lower identically constructed and stacked bodies, magnets being disposed in upper and lower surface aligning locations of each of said stacked bodies, a selected one of each of mating pair of magnets being influenced by an underside positioned spring into contact with the other selected magnet to facilitate inter-attraction between said bodies in a non-use condition.

* * * * *